United States Patent [19]

Wolfinger et al.

[11] Patent Number: 4,757,717

[45] Date of Patent: Jul. 19, 1988

[54] APPARATUS AND METHOD FOR MEASURING VIBRATION OF A ROTATING MEMBER

[75] Inventors: John F. Wolfinger; Abraham S. Assa, both of Schenectady, N.Y.; John M. Reschovsky, Framingham, Mass.

[73] Assignee: General Electric Company, Schenectady, N.Y.

[21] Appl. No.: 934,767

[22] Filed: Nov. 25, 1986

[51] Int. Cl.[4] .......................................... G01H 11/02
[52] U.S. Cl. ..................................... 73/660; 324/207
[58] Field of Search ................................ 73/654, 660; 340/870.31; 324/207, 208; 331/14

[56] References Cited

U.S. PATENT DOCUMENTS

| | | | |
|---|---|---|---|
| 3,208,269 | 12/1951 | Eccles et al. | 73/660 |
| 4,310,804 | 1/1982 | Ryan | 331/14 |
| 4,507,658 | 3/1985 | Keating | 342/118 |
| 4,510,809 | 4/1985 | Fillion | 73/457 |
| 4,518,917 | 5/1985 | Oates et al. | 324/207 |
| 4,573,358 | 3/1986 | Luango | 73/660 |
| 4,644,270 | 2/1987 | Oates et al. | 324/207 |

OTHER PUBLICATIONS

Inductive Method for Measuring Rotor Blade Vibrations on Turbomachines (Staheli, Sulzer Technical Review, 1975).

Rotor Blade Vibration Observed from the Casing—H. Raby, Jun. 1970.

Primary Examiner—Stewart J. Levy
Assistant Examiner—Lawrence G. Fess
Attorney, Agent, or Firm—Jerome C. Squillaro

[57] ABSTRACT

An electrical conductor forming a grid only partially circumferentially surrounds the path of the outer portion of a rotatable member. The member has a magnet coupled thereto for influencing the grid to produce a signal indicative of vibration of the member whenever the magnet is within a predetermined distance of the grid. During the interval that the magnet does not influence the grid, a synthesis signal, indicative of vibration of the member during the previous influence portion of the revolution, is generated. The influence signal and the synthesis signal may be provided to processing apparatus for obtaining vibration information. Providing both an influence signal and a synthesis signal substantially simplifies processing apparatus that would otherwise be needed should only an essentially null signal be available during the interval in which the magnet does not influence the grid. In another embodiment, switching means coordinated with rotation of a plurality of members permits use of a plurality of partially circumferentially disposed grids for monitoring vibration of each of the plurality of members.

10 Claims, 4 Drawing Sheets

APPARATUS AND METHOD FOR MEASURING VIBRATION OF A ROTATING MEMBER

BACKGROUND OF THE INVENTION

The present invention relates to apparatus and method for measuring vibration of a rotating member and, more particularly, to apparatus and method for measuring vibration of the member when a signal representative of vibration of the member is only available during a portion of a complete revolution of the member and/or is not continuously available during a complete revolution of the member.

It is often desirable to determine vibration of a rotatable member, especially when the member may be subject to vibration due to its physical orientation and/or operating environment. For example, such a member may include a blade, or bucket, of an axial fluid flow turbine which is rigidly secured at a radially inner portion thereof to a shaft and which may be relatively free standing at the radial outer end thereof, so as to form a cantilever configuration.

In one application, the vibratory pattern of the member may be used to develop a "signature" of the machine. That is, the vibratory pattern of the member may be determined during normal operating conditions upon initial installation of the machine or at some other desired time. Periodic or continual monitoring of the vibratory pattern of the member, after establishment of the signature, may detect a change in the pattern, which through operating history and comparative similar changes of like members, may be determined to be indicative of a particular abnormal operating condition of the machine and/or member. Such changes in vibratory pattern may be able to be detected well before other more debilitating or detrimental physical events are manifested by the machine. For example, a change in the vibratory pattern of a member may provide an early indication of problems associated with the bearings and/or support foundation of the machine. In addition, excessive vibration of a member may result in fatigue which if continued over a sustained period of time may cause cracking and/or rupture of the member.

One such apparatus for monitoring vibration of a blade of an axial flow compressor or turbine is described in U.S. Pat. No. 3,208,269—Eccles et al. The apparatus of the U.S. Pat. No. 3,208,269 shows an electrical conductor of a generally zigzag shape, substantially totally circumferentially surrounding the path described by the outer portion of the blade. Further, to monitor vibration of a plurality of blades using the teachings of the U.S. Pat. No. 3,208,269, it is necessary to use at least as many axially spaced apart zigzag conductors as the number of blades to be monitored. This results in using more space than may be available for deploying the multiple zigzag conductors and further requires substantially increased care when positioning the zigzag conductors in order to ensure that the branches of the conductors are equally circumferentially spaced about the radial outer extremity of the blades. In addition, axial expansion of the shaft during operation necessitates that the conductors be accurately axially spaced. Unequal circumferential spacing between branches of the conductors will result in an undesirable modulation of the carrier signal to be generated in the conductors, which will ultimately be detected as a vibration, while improper axial spacing may result in a magnet influencing the wrong conductor. Further, it may not be desirable or feasible to entirely circumferentially surround the blades with a zigzag conductor, such as when the housing surrounding the blades is segmented.

Accordingly, it is an object of the present invention to provide means and method for monitoring one or more rotating members without having to use a respective axially spaced apart zigzag conductor for each member being monitored.

Another object of the present invention is to provide means and method for monitoring a rotating member without need to totally circumferentially surround the member with a conductor.

SUMMARY OF THE INVENTION

In accordance with the present invention, an electrical conductor forming a grid only partially circumferentially surrounds the path of the outer portion of a rotatable member. The member has a magnet coupled thereto for influencing the grid to produce a signal indicative of vibration of the member whenever the magnet is within a predetermined distance of the grid. During the interval that the magnet does not influence the grid, a synthesis signal, indicative of vibration of the member during the previous influence portion of the revolution, is generated. The influence signal and the synthesis signal may be provided to processing apparatus for obtaining vibration information. Providing both an influence signal and a synthesis signal substantially simplifies processing apparatus that would otherwise be needed should only an essentially null signal be available during the interval in which the magnet does not influence the grid. In another embodiment, switching means coordinated with rotation of a plurality of members permits use of a plurality of partially circumferentially disposed grids for monitoring vibration of each of the plurality of members.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

BRIEF DESCRIPTION OF THE DRAWING

FIGS. 4A-4G are typical waveforms at selected points of the circuit of FIG. 3.

DETAILED DESCRIPTION

Figure 1:
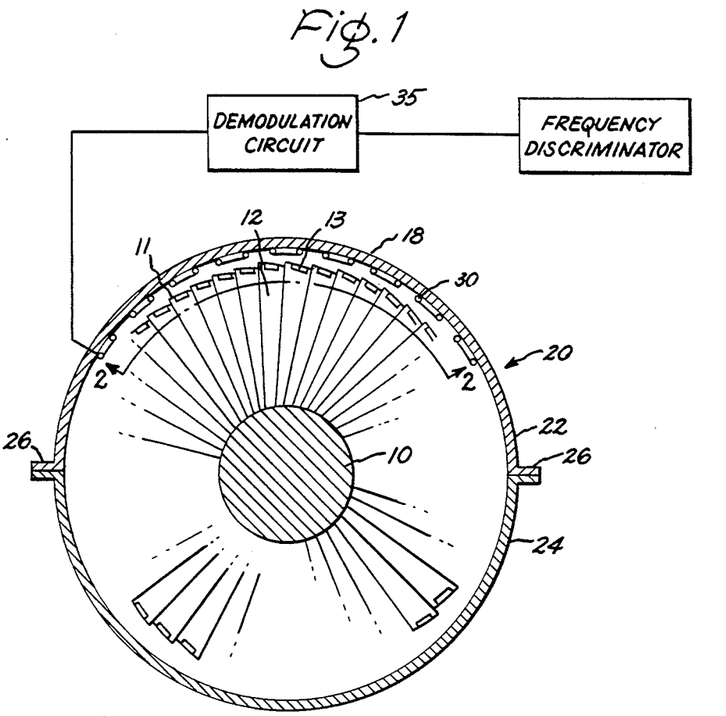
FIG. 1 is an axial view of an axial fluid flow turbine showing a conductor partially circumferentially disposed about the radial outer portion of a bucket in accordance with the present invention.

Referring to FIG. 1, a simplified axial view of an axial fluid flow turbine 20 is shown. Although the present invention will be discussed as it may be applied to an axial fluid flow turbine, it is to be understood that the present invention is generally applicable to any machine or apparatus having rotating components. Turbine 20 comprises a rotatably mounted shaft 10 having a plurality of blades, or buckets 11, one of which is designated as 12, fixedly coupled to the periphery of shaft 10 by conventional means, such as a wheel or interlocking dovetail (not shown), and rotatable therewith, and a pressurizable housing 18 circumferentially surrounding and spaced from the radially outer portion of buckets 11. Of course, for application of the present invention to a motor (not shown), for example, the housing need not be pressurized. Housing 18 includes an upper half portion 22 and a lower half portion 24 which are sealingly coupled together at sealing flanges 26. A magnetic means 13, such as a permanent magnet, is fixedly secured to the radially outer portion or tip of bucket 12 so as to accurately reproduce movement of the radially outer portion of bucket 12 during operation of turbine 20.

Affixed to or embedded in and electrically insulated from upper housing portion 22 is an electrical conductor 30, which is disposed in magnetic flux communication with magnetic means 13 during at least a portion of each revolution of bucket 12, such as when magnet 13 is disposed adjacent conductor 30 during operation of turbine 20, so that an electrical voltage is induced in conductor 30 when magnet 13 passes in proximity thereto. Conductor 30 circumferentially extends over the inner surface of upper housing portion 22, wherein the arcuate extent of conductor 30 is less than or equal to the arcuate spacing between joints 26, so that conductor 30 does not span joints 26. The desired arcuate extent of conductor 30 may be readily selected by one of ordinary skill in the art in accordance with the following description. A demodulation circuit 35 includes an input coupled to conductor 30. Although conductor 30 need not be arcuately centered between flanges 26 of upper housing portion 22, it is preferable that conductor 30 not extend beyond either of flange 26 of upper portion 22 and onto lower portion 24 of housing 18 in order to avoid any break in conductor 30 which may be necessary to bridge flange 26 and further to facilitate manufacture and alignment of conductor 30 with respect to the bucket 12.

Figure 2:
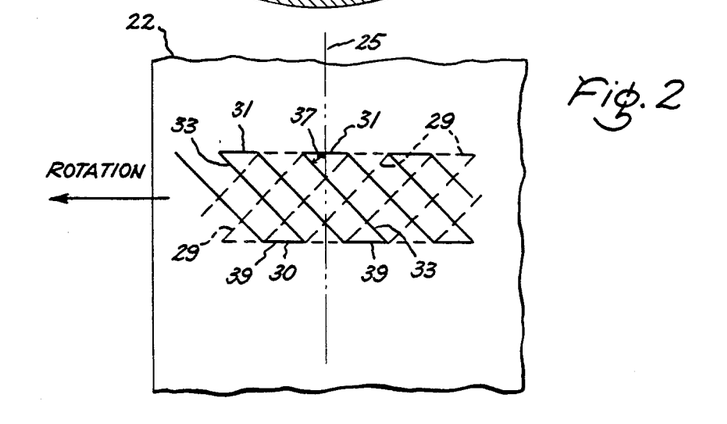
FIG. 2 is a view looking in the direction of the arrows of line 2—2 of FIG. 1.

Referring to FIG. 2, a view looking in the direction of the arrows of line 2—2 of FIG. 1 is shown. Shown for reference is a line 25 that is parallel to the axis of rotation of shaft 10. Conductor 30 is disposed in a zigzag pattern along the inner periphery of and electrically insulated from upper half housing 22. Legs 31 and 39 of conductor 30 are spaced apart far enough to accommodate axial growth of shaft 10 due to operational thermal effects. Arms 33 of conductor 30 are disposed parallel to each other and may preferably be skewed with respect to line 25 at an angle 37 equal to 45° for ease of computation of the axial and tangential components of vibration of bucket 12. The nominal path described by magnet 13 lies in a plane which is perpendicular to line 25 and predeterminedly spaced between legs 31 and 39 of conductor 30 when no vibration or oscillatory movement is experienced by bucket 12. When bucket 12 is rotating without vibration, the voltage induced in conductor 30 by magnet 13 has a base or carrier frequency related to the speed of rotation. Should bucket 12 vibrate so as to cause magnet 13 to deviate from its typical path during rotation, then magnet 13 will induce a voltage in conductor 30 having a portion indicative of the vibration of bucket 12. In particular, this induced voltage will indicate the component of the magnet's vibration which is perpendicular to the conductor arms, 33. When bucket 12 is vibrating while rotating, voltage induced by magnet 13 includes a modulation of the base signal, or carrier frequency.

A second conductor 29, as indicated by a dashed line in FIG. 2, may be disposed in the inner periphery of upper half housing 22 in a zigzag configuration that is complementary to and overlays conductor 30. Conductor 29 is electrically insulated from conductor 30 and housing 22. Conductor arms 29 are skewed with respect to line 25 at an angle of 45° and are therefore perpendicular to conductor arms 33. The voltage induced in conductor 29 is indicative of the component of magnet vibration that is perpendicular to conductor arms 29. Use of a combination of conductors 29 and 30 permits the determination of two perpendicular components of magnet 13 vibration, as manifested by voltage induced in conductors 29 and 30. The axial and tangential components of vibration can be readily determined from these components.

Figures 3, 4:
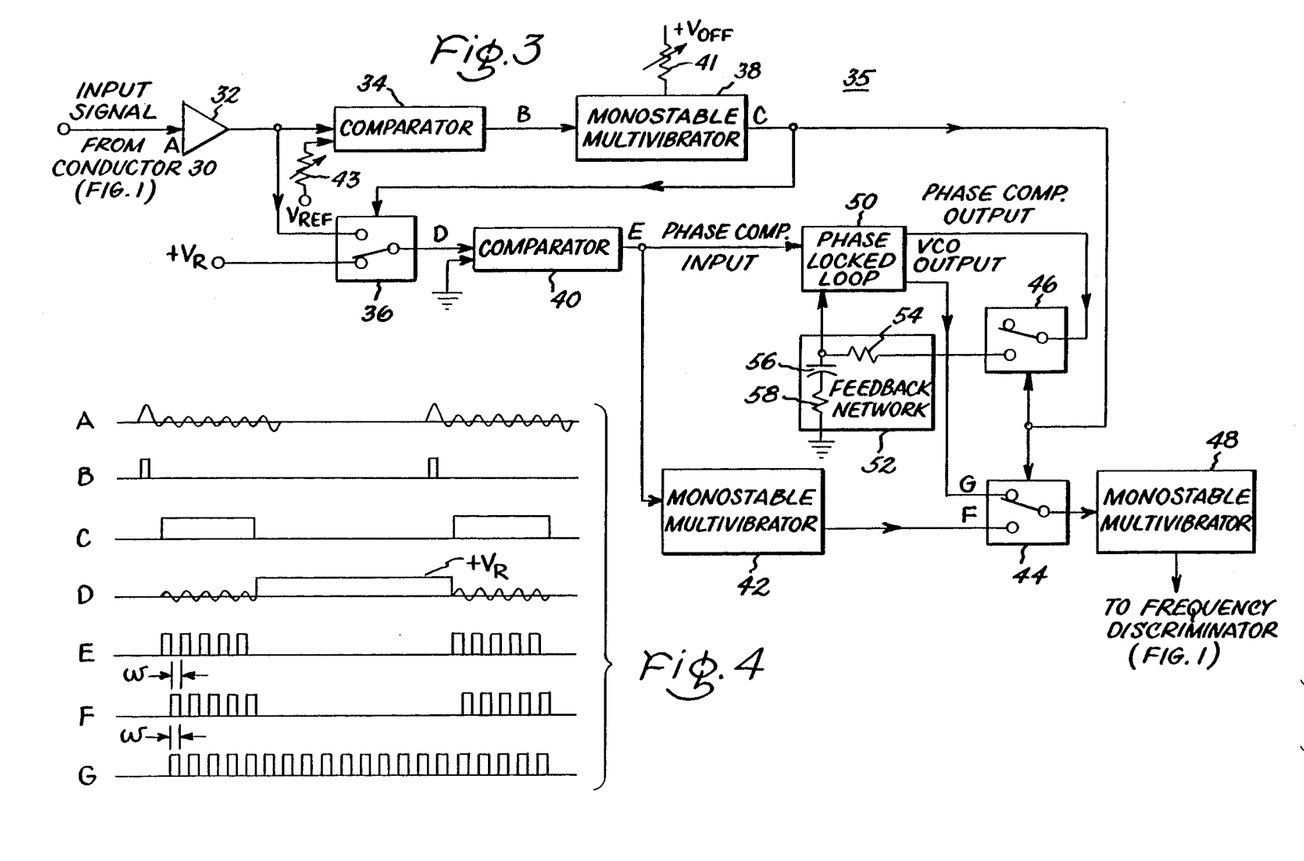
FIG. 3 is a block diagram of a circuit useful for determining vibration of the bucket of FIG. 1 being monitored.

Referring to FIG. 3, a block diagram of demodulation circuit 35 is shown. Letter designators A through G are used to identify circuit points at which respective typical signal waveforms, as illustrated in FIG. 4, may be observed. In the following description, letters in parentheses indicate the circuit point at which a signal is available and also refer to the corresponding typical waveform for the signal as shown in FIG. 4.

An input of amplifier 32, constituting the input of demodulation circuit 35, is connected to conductor 30 (FIG. 1). The output of amplifier 32 is connected to an input of a comparator 34. Another input of comparator 34 is coupled to a reference voltage $V_{REF}$ through a variable resistor 43 for selecting the threshold of input signal (A) at which trigger signal (B), available at the output of comparator 34, is activated. The output of amplifier 32 is also connected to the normally open terminal of a switch 36. The output of comparator 34 is connected to a monostable multivibrator 38, which has its output connected to switches 36, 44 and 46 for coupling a control, or gating signal (C), respectively thereto. Another input of monostable multivibrator 38 is connected to reference voltage $V_{REF}$ through a variable resistor 41 for adjusting the timing for issuance of gating signal (C) with respect to trigger signal (B). Although switches 36, 44 and 46 are shown as mechanical switches, they may each include an electronic switch, such as field effect transistor (FET).

The normally closed terminal of switch 36 is connected to a source of reference voltage $+V_R$ and the common terminal of switch 36, having the gated input signal (D) available thereat, is connected to an input of comparator 40. Another input of comparator 40 is connected to ground potential. The output of comparator 40, having the phase comparator input signal (E) available thereat, is connected to an input of a phase locked loop 50 and an input of a monostable multivibrator 42. One output of phase locked loop 50, having the phase comparator output signal available thereat, is connected to the common terminal of switch 46 and another output of phase locked loop 50, having the VCO output signal (G) available thereat, is connected to the normally closed terminal of switch 44. The output of multivibrator 42, having the modified input signal (F) available thereat, is connected to the normally open terminal of switch 44. The common terminal of switch 44 is connected to the input of a monostable multivibrator 48 whose output constitutes the output of demodulation circuit 35.

A feedback network 52 for maintaining a constant bias voltage at another input of phase locked loop 50 during the interval in which gating signal (C) is active, and thereby constraining the frequency of the VCO output signal (G) during the active interval of gating signal (C) to be equal to the frequency of the VCO output signal (G) immediately prior to the active interval of gating signal (C), is connected between the normally open terminal of switch 46 and the other input of phase locked loop 50, and comprises resistors 54 and 58 and a capacitor 56. The other input of phase locked loop 50 is connected to ground potential through the series combination of capacitor 56 and resistor 58 and to the normally open terminal of switch 46 through resistor 54.

Operation of demodulation circuit 35 will now be described. Magnetic influence signal or input signal (A), available from conductor 30 (FIG. 1), is indicative of the voltage induced in conductor 30 by magnet 13. As can be observed from waveform A of FIG. 4, input signal (A) includes a periodic sinusoidal-like signal during the interval that magnet 13 induces a voltage in conductor 30 (FIG. 1) followed by a predetermined interval during which no appreciable signal is present and then followed by a repetition of the sinusoidal-like signal as magnet 13 once again induces a voltage in conductor 30 (FIG. 1). The initial cycle of input signal (A) has a greater amplitude then the remaining cycles of input signal (A) because of a transient effect when rotating magnet 13 first induces a voltage in conductor 30 (FIG. 1). The greater magnitude of the first cycle of input signal (A), which is amplified by amplifier 32 and provided to one input of comparator 34, is used in conjunction with a voltage supplied to the other input of comparator 34 from variable resistor 43 to generate trigger signal (B), which is supplied to monostable multivibrator 38. Variable resistor 43 is adjusted so that trigger signal (B) transitions from a quiescent level to a predetermined level when the leading edge of the first cycle of input signal (A) is slightly greater than the expected maximum amplitude of the remaining cycles of input signal (A) and then transitions from the predetermined level to the quiescent level of trigger signal (B) when the trailing edge of the first cycle of signal input (A) decreases to the same magnitude at which trigger signal (B) transitions on the leading edge of the first cycle of input signal (A), thereby creating a pulse-type waveform for trigger signal (B).

Monostable multivibrator 38 comprises a dual stage multivibrator. The first stage of monostable multivibrator 38 permits an adjustable delay, such as may be controlled by variable resistor 41, between receipt of trigger signal (B) at the input of the first stage, whose input constitutes the input of monostable multivibrator 38, to activation of the second stage, whose output constitutes the output of monostable multivibrator 38 and has gating signal (C) available thereat. The delay between receipt of the pulse of trigger signal (B) and the leading edge of gating signal (C) is adjusted so that the leading edge of gating signal (C) occurs in time slightly before the first positive going zero crossing of input signal (A) after the trailing edge of trigger signal (B). Of course, monostable multivibrator 38 may be a single stage multivibrator coupled to a separate delay circuit.

Transition of gating signal (C) from a quiescent state to an active state (indicated by a positive going waveform) causes the normally open terminal of switches 36, 44 and 46 to be connected to the common terminal of switches 36, 44 and 46, respectively, while the normally closed terminal of switches 36, 44 and 46 is disconnected from the respective common terminal, and to remain so switched until gating signal (C) transitions from its active state to its quiescent state.

During the interval that gating signal (C) is in its active state, the amplified input signal available from the output of amplifier 32 is supplied as the gated input signal (D) through switch 36 to an input of comparator 40. The other input of comparator 40 is connected to ground potential. By appropriately adjusting the time delay associated with monostable multivibrator 38, gated input signal (D) is made to appear substantially equivalent to input signal (A) with its initial larger amplitude first cycle removed. The phase comparator input signal (E), available at the output of comparator 40, is provided to an input of phase locked loop 50 and to the input of monostable multivibrator 42. Phase comparator input signal (E) is a substantially rectangular pulse train that changes state each time gated input signal (D) crosses zero during the active interval of gating signal (C).

During the interval that gating signal (c) is in its active state, phase locked loop circuit 50 compares an internally generated voltage controlled oscillator (VCO) signal (which is also available as VCO output signal (G) from an internal voltage controlled oscillator (not shown)) with phase comparator input signal (E) and generates an internal control signal proportional to the phase difference between them. The instantaneous frequency of the VCO output signal from the internal voltage controlled oscillator of phase lock loop 50 is modified in response to the internal control signal, such that the frequency of the VCO output signal from the internal VCO of phase locked loop 50 is equal to the instantaneous frequency of phase comparator input signal (E). Phase locked loop circuit may include conventional circuitry as is known in the art.

During the interval that gating signal (C) is active, the phase comparator output signal from phase locked loop 50 is supplied to another input of phase locked loop 50 through switch 46 and feedback network 52. Feedback network 52 includes resistor 54 having one end thereof connected to the normally open terminal of switch 46 and the other end thereof, having the frequency regulation signal available thereat, connected to the other input of phase lock loop 50 and a series combination of capacitor 56 and resistor 58, with resistor 58 having one end thereof connected to ground potential and capacitor 56 having the end not connected to resistor 58 connected to the other input of phase locked loop 50. Thus the frequency of the VCO output signal (G) is constrained to equal the frequency of the phase comparator input signal (E), which in turn is representative of the frequency of input signal (A) during the interval that conductor 30 (FIG. 1) is influenced by magnet 13 (FIG. 1).

During the interval that conductor 30 is not influenced by magnet 13, input signal (A) Is substantially zero volts and gating signal (C) transitions to an inactive state (indicated as a substantially zero voltage), thereby causing each of switches 36, 44 and 46 to have the respective normally closed terminal thereof connected to the common terminal thereof. A reference voltage $V_R$ is applied through switch 36 as gated input signal (D) to one input of comparator 40. Since the other input of comparator 40 is connected to ground potential, phase comparator input signal (E) will be maintained in an inactive state (indicated by the zero voltage position of waveform (E) of FIG. 4) as long as reference voltage $V_R$ is supplied to the one input of comparator 40. Whenever the inactive state of phase comparator input signal (E) is sensed at the first input of phase locked loop 50, the phase comparator input signal (E) has no effect on and therefore does not alter the frequency of the VCO output signal (G) from phase locked loop 50. Also, during the interval in which gating signal (C) is inactive, the normally open terminal of switch 46, and thereby the input to feedback network 52, is disconnected from the phase comparator output signal available at the common terminal of switch 46. Thus, capacitor 56 retains the voltage applied thereto during the immediately preceeding active interval of gating signal (C), such that the frequency of the VCO output signal (G) from phase locked loop 50 is equal to the average frequency value of the phase comparator input signal (E) (and thereby the frequency of the input signal (A)) during the immediately preceeding active interval of gating signal (C). VCO output signal (G) is applied to the input of monostable multivibrator 48 through switch 44 during the interval in which gating signal (C) is inactive.

During the active interval of gating signal (C), phase comparator input signal (E) causes monostable multivibrator 42 to activate modified input signal (F), which signal includes a pulse, available at the output of monostable multivibrator 42, whose leading edge transitions on the trailing edge of phase comparator input signal (E) and whose pulse width w is predeterminedly selected to be less than one-half the width of one half cycle of phase comparator input signal (E) by appropriate choice of components for monostable multivibrator 42. The output of monostable multivibrator 42 is connected to the normally open terminal of switch 44 so that the modified input signal (F) from monostable multivibrator 42 is supplied to the input of monostable multivibrator 48 during the interval in which gating signal (C) is active.

Briefly, the demodulation circuit 35 of FIG. 3 supplies the modified input signal (F), having a frequency indicative of the frequency of input signal (A), to monostable multivibrator 48 when conductor 30 is influenced by magnet 13, and provides the VCO output signal (G), having a frequency indicative of the average frequency of phase comparator input signal (E) during the immediately preceeding active interval of gating signal (C), to monostable multivibrator 48 during the interval that magnet 13 does not influence conductor 30. In effect, a "frequency coast" mode is obtained wherein the frequency of the signal supplied to the input of monostable multivibrator 48 is equal to the average frequency of input signal (A) available from conductor 30 during the interval immediately preceeding activation of the frequency coast mode, which mode occurs when input signal (A) is not available. The signal available at the output of monostable multivibrator 48 may be further processed for obtaining frequency information therefrom, such as by processing in a conventional FM demodulator, and/or for displaying and/or activating alarms should vibration or deviation of bucket 12 exceed predetermined limits.

Should conductor 29 (FIG. 2) also be desired and used, then an output from conductor 29 would supply a magnetic influence, or input signal, to a demodulation circuit that is identical to circuit 35. The respective output signals from the analogous demodulation circuit and circuit 35 may be processed as hereinafter explained to provide tangential and axial velocity components of magnet 13.

Figures 5, 7:
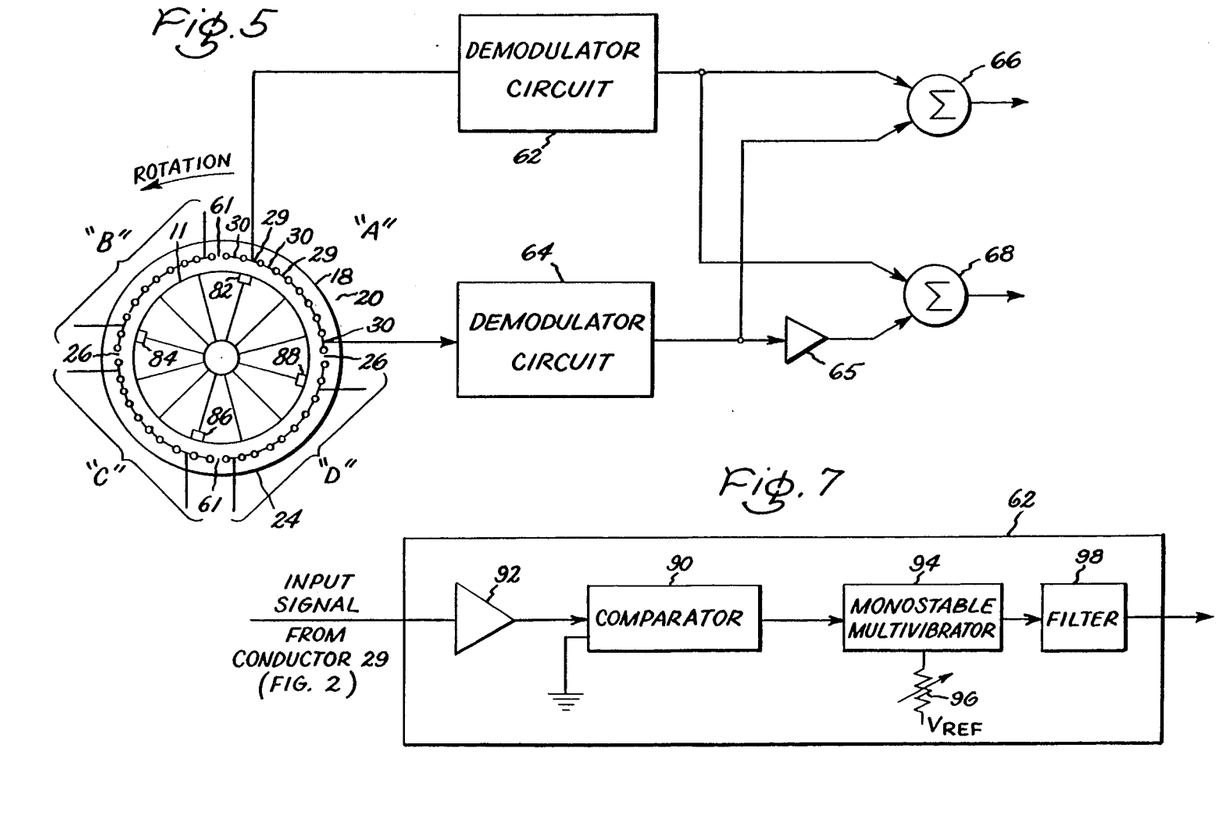
FIG. 5 is a simplified schematic diagram of another embodiment of the present invention.
FIG. 7 is a block diagram of a demodulator circuit useful with the embodiment of FIG. 5.

Referring to FIG. 5, a simplified partial schematic and block diagram of another embodiment of the present invention is shown. Grid A comprises conductor 29 and 30, which may be disposed as described with respect to FIG. 2 and extend over about 90° of the inner surface of upper half portion 22 of housing 18. A similar pair of conductors forms grid B which extends over about the other 90° of the inner surface of upper half portion 22 of housing 22. Grids A and B are disposed so that the conductors thereof preferably do not span joint 26 and are further disposed so that the conductors of grid A are physically separated from the conductors of grid B by a gap 61 in order to electrically isolate the respective conductors of grids A and B. It is desirable to make gap 61 so that the spacing between the last cross arm, 33 in FIG. 2, of grid A and the first cross arm in grid B is equal to the normal spacing between cross arms 33 in FIG. 2. This grid spacing will minimize transient response and dead time of the signal to be magnetically induced therein when shaft 10 rotates. A similar configuration including grids C and D is disposed in lower half portion 24 of housing 18.

Magnets 82, 84, 86 and 88 are mounted on the respective tip of buckets, analogously to magnet 13 and bucket 12 (FIG. 1), spaced at 90° with respect to arcuately adjacent magnets. Magnets 82, 84, 86 and 88 may be disposed so that they all lie in substantially the same plane when rotating, so that the conductors of grids A, B, C and D can readily accommodate axial growth of the shaft as hereinbefore explained. Thus, with particular reference to the configuration shown in FIG. 6 of the aforementioned U.S. Pat. No. 3,208,269, problems associated with aligning the conductors of the grid, especially to accommodate axial expansion of the shaft, wherein the grid includes a respective axially spaced conductor for each magnet and the position of the magnets are staggered so that they each lie in a respective different plane when rotating, are avoided.

A demodulator circuit 62 has an input connected to conductor 29 and a demodulator circuit 64 has an input connected to conductor 30 for receiving the respective induced voltage signal therefrom. Since it is expected that each conductor of grid A, B, C and D will have a substantially continuous signal induced therein, it is not necessary that demodulator circuit 62 and 64 be the same as demodulation circuit 35 (FIG. 3), and in fact, a relatively less complex demodulator circuit 62, such as shown in FIG. 7, may be used.

Referring to FIG. 7, demodulator circuit 62 comprises an amplifier 92 having an input constituting the input of demodulator circuit 62 connected to conductor 29 (FIG. 5) of grid A, a comparator 90 having one input connected to the output of amplifier 92 and another input connected to ground potential, and a monostable multivibrator 94 having an input connected to the output of comparator 90 and an output connected to the input of filter 98; the output of filter 98 constitutes the output of demodulator circuit 62. Multivibrator 94 includes means for adjusting the width of its output pulse, as indicated schematically by an adjustable resistor 96 serially connected between another input of multivibrator 94 and reference voltage V$_{REF}$. Demodulator circuit 64 may be configured analogously to demodulator 62 while having its input connected to conductor 30 (FIG. 5) of grid A. Likewise, a pair of demodulator circuits analogous to demodulator circuits 62 and 64 and having appropriate connection to the conductors of grids B, C and D, may be provided for each of grids B, C and D.

In operation, the signal available at the output of amplifier 92, which signal may be similar to waveform A (FIG. 4), except that the sinusoidal-like signal is continuously present, is supplied to comparator 90. In response to the signal provided thereto, comparator 90 supplies a substantially square wave signal (similar to waveform (E) of FIG. 4) that is available at the output of comparator 90, and which transitions between a quiescent and an active state at alternate zero crossings of the signal from amplifier 92, respectively, to an input of monostable multivibrator 94. The rising edge (or falling edge, if desired) of the signal from the output of comparator 90 is provided to monostable multivibrator 94 and is used to activate monostable multivibrator 94. The signal available at the output of monostable multivibrator 94 transitions from a quiescent state to an active state in response to the signal from comparator 90 and remains in the active state for a predetermined interval w, which interval may be adjusted as indicated schematically by resistor 96 connected to reference voltage V$_{REF}$, before transitioning to the quiescent state. The output of monostable multivibrator 94 is provided to low pass filter 98. The output of low pass filter provides only lower frequency components of the output of multivibrator 94 which are representative of the vibration of magnets 82, 84, 86 and 88.

Referring again to FIG. 5, the output of demodulator circuit 62 is connected to an input of adder means 66 and 68 and the output of demodulator circuit 64 is connected to another input of adder means 66 and to another input of adder means 68 through an inverter 65. When conductors 29 and 30 are oriented so that respective arms thereof are disposed at +45° and -45° with respect to the axis of rotation of the shaft, addition of signals available at the inputs of adder means 66 generates a signal that is available at the output of adder means 66 which is indicative of the tangential velocity of the magnet (and thereby the associated bucket) responsible for the signal provided to the inputs of adder means 66. Likewise, for the same physical relationship between conductor 29 and 30, addition of the signal available at the input of adder means 68 from demodulator circuit 62 and of the signal available at the input of adder means 68 from the output of inverter 65 generates a signal that is available at the output of adder means 68 which is indicative of the axial velocity of the magnet (and thereby the associated bucket) responsible for the signal provided to the input of adder means 68. Although, circuit element 68 is shown as adder means, which adds an inverted, or negative, signal generated by inverter 65, circuit element 68 may alternatively include subtractor means which subtracts the signal available at the output of demodulator circuit 64 from the signal available at the output of demodulator circuit 62 to provide a signal at the output of circuit element 68 that is indicative of axial velocity of the magnet.

Figure 6:
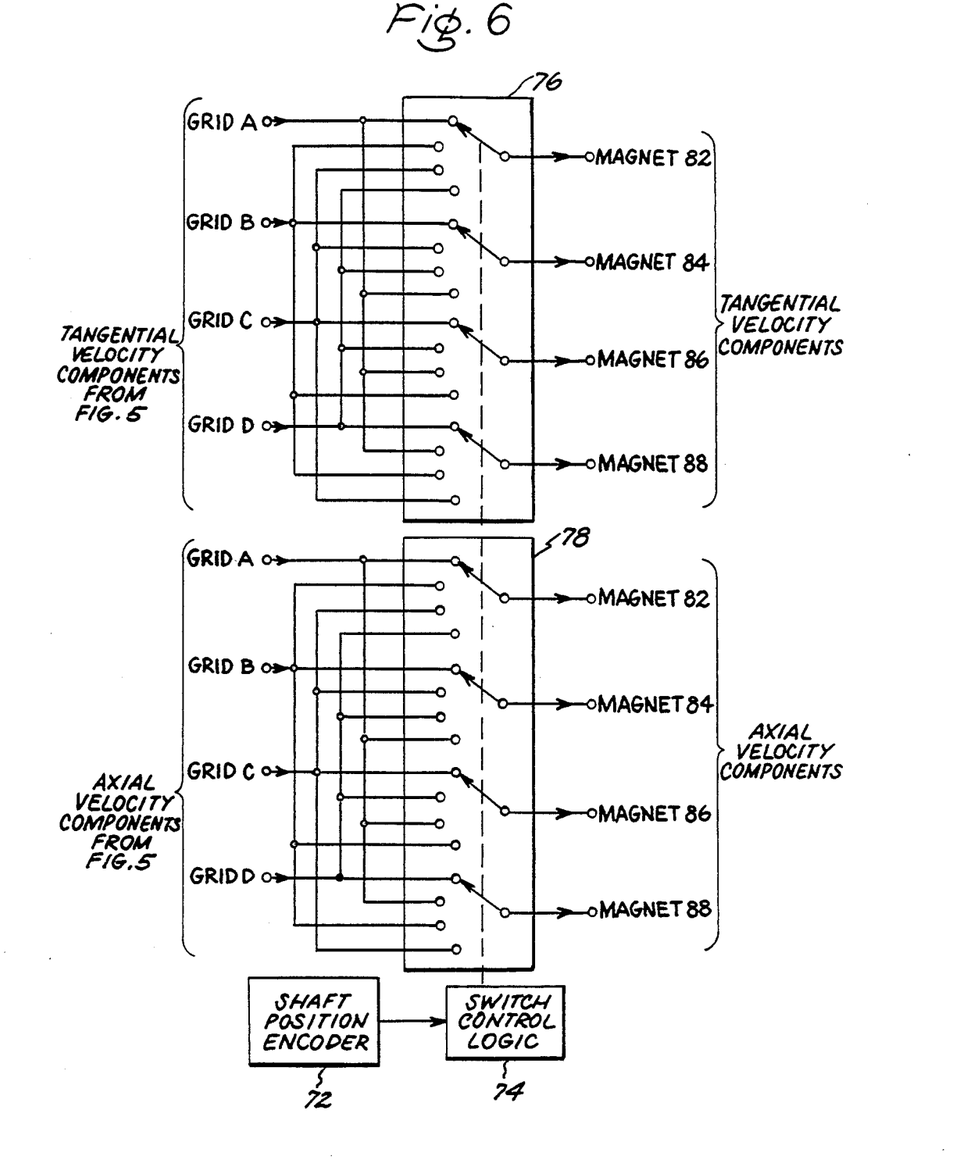
FIG. 6 illustrates switching circuitry useful with the embodiment of FIG. 5.

Referring to FIG. 6, switching means 76 and 78, such as a respective ganged multiple section electronic switch like a multiplexer, and useful with the present invention, are shown. Of course, switching means 76 and 78 may comprise a coordinated plurality of single components or some other configuration of multiple components if desired. The output of adder means 66 (FIG. 5) is connected to an input, designated GRID A, of switching means 76 and the output of adder means 68 (FIG. 5) is connected to an input, designated GRID A, of switching means 78. Likewise, corresponding outputs from adder means associated with grids B, C and D (FIG. 5) are connected as indicated to appropriate inputs of switching means 76 and 78. Shaft position encoder 72 may include conventional means, such as an absolute optical position encoder fixedly coupled to shaft 10 (FIG. 1) and producing an indication of the angular position of shaft 10 so that respective timing between the magnets and corresponding inputs of switching means 76 and 78 can be coordinated, for determining the relative position between a predetermined point on the surface of shaft 10 or between a predetermined magnet, say magnet 82, since magnets 82, 84, 86 and 88 are nominally fixed with respect to the periphery of shaft 10, and grids A, B, C and D. Switch control logic means 74, such as digital comparator circuits, is coupled to each of switching means 76 and 78 and to the output of a shaft position encoder 72 for coordinating coupling between the respective inputs and outputs of switching means 76 and 78. Respective outputs of switching means 76 have available thereat a signal representative of the tangential velocity component due to influence of magnet 82, 84, 86 and 88 on conductors of grids A, B, C and D. Likewise, respective outputs of switching means 78 have available thereat a signal representative of the axial velocity component due to influence of magnet 82, 84, 86 and 88 on conductors of grids A, B, C and D. Signals available from the respective outputs of switching means 76 and 78 may be processed using conventional apparatus, such as spectrum analyzers, well known in the art for extracting desired information therefrom.

Switching means 76 and 78 are shown connected to the outputs of demodulator circuits 62 and 64 (FIG. 5) so that demodulated signals therefrom are decommutated. Alternatively, switching means 76 and 78 may be connected so that outputs of switching means 76 and 78 are connected to appropriate inputs of demodulator circuits 62 and 64, and inputs of switching means 76 and 78 are connected to appropriate conductors 29 and 30 of grids A, B, C and D (FIG. 5), so that signals available from grids A, B, C and D may be decommutated before being applied to demodulator circuits 62 and 64.

Referring to FIGS. 5 and 6, operation of the decommutation circuitry is as follows. For the configuration of FIG. 5, assume that shaft 10 is rotating in the direction shown and is positioned so that magnet 82 influences grid A and magnets 84, 86 and 88 influences grids B, C and D, respectively. The appropriate orientation of switching means 76 and 78 for this assumption is shown in FIG. 6. The signal path associated with magnet 82 will be described as magnet 82 traverses one complete revolution. With magnet 82 influencing grid A, the tangential and axial velocity components from the circuitry associated with grid A (i.e. from conductors 29 and 30, respectively, are directed through switching means 76 and 78 to the uppermost output (identified as MAGNET 82), respectively, thereof. As magnet 82 traverses gap 61 and begins to influence the conductors of grid B, shaft position encoder 72 provides signals, available at the output of encoder 72, indicative of the current shaft position. In response to the signals from encoder 72, the switch control logic 74, sends command signals to switching means 76 and 78, which are shown schematically in FIG. 6, causing the central pole of each switch section to rotate counter-clockwise to connect the next encountered normally open terminal. Thus, in tracing the signal path for magnet 82 which is now assumed to be influencing GRID B, the grid B inputs of switching means 76 and 78 are respectively coupled through switching means 76 and 78 to respective outputs thereof designated MAGNET 82. As shaft 10 continues to rotate, magnet 82 crosses the gap between grid B and C at joint 26 and begins to influence grid C. In response to further signals from encoder 72 which are supplied to switch control logic 74, the central pole of each of the switch sections of switching means 76 and 78 is caused to rotate counter-clockwise to connect the next encountered normally open terminal to the common terminal of respective switch sections of switching means 76 and 78. Thus, analogously to grip B described above, the signal from grid C that results from influence of magnet 82 is directed to respective outputs of switching means 76 and 78 designated MAGNET 82. The above-described switching occurs once again when magnet 82 crosses gap 61 and begins to influence grid D. When magnet 82 crosses the gap at joint 26 and begins to influence grid A, switching means 76 and 78 return to their originally assumed status as shown in FIG. 6.

From the foregoing description one of ordinary skill in the art will appreciate that due to cooperation and coordination between shaft 10, shaft position encoder 72, switch control logic 74 and switching means 76 and 78, a signal representative of the tangential and axial velocity components due to influence of magnet 82 is available at the respective output of switching means 76 and 78 labeled MAGNET 82, regardless of which of grids A, B, C or D magnet 82 is influencing. Further, since magnets 84, 86 and 88 are disposed to change influence from one grid to the next grid at the same time that magnet 82 changes the grid it is influencing, the above-described operation similarly accommodates magnets 84, 86 and 88, so that a signal representative of the respective tangential and axial velocity components due to influence of magnet 84, 86 and 88 are available at the respective output of switching means 76 and 78 labeled MAGNET 84, MAGNET 86 and MAGNET 88, regardless of which of grids A, B, C or D magnets 84, 86 and 88 are influencing.

Demodulation circuit 35 of FIG. 3 has been described with respect to having a single magnet 13 (FIG. 1) influence conductor 30. It is possible to provide a respective plurality of demodulation circuits 35 and a corresponding plurality of arcuately spaced apart magnets disposed on respective predetermined buckets of the plurality of buckets 11 (FIG. 1) such that only one of the plurality of magnets at a time influences conductor 30. The input signal to respective demodulation circuits 35 from conductor 30 is appropriately switched to correspond to the appropriate magnetic influence signal from conductor 30. Timing for such switching may be provided, for example, by an indicator, such as a magnetic pickup or discontinuity fixedly coupled to shaft 10 and producing an indication once each revolution of shaft 10 so that respective timing between the magnets and corresponding inputs of the plurality of demodulation circuits 35 can be coordinated. Thus only a single conductor 30 is needed to monitor a plurality of buckets.

While only certain preferred features of the invention have been shown by way of illustration, many modifications and changes will occur to those skilled in the art. It is to be understood that the appended claims are intended to cover all such modifications and changes as fall within the true spirit and scope of the invention.

Thus has been illustrated and described means and method for monitoring one or more rotating members without having to use a respective axially spaced apart zigzag conductor for each member being monitored and for monitoring a rotating member without need to totally circumferentially surround the member with a conductor.

What is claimed is:

1. Apparatus for determining vibration of a rotatable member comprising:

conducting means for responding to magnetic influence, partially circumferentially surrounding said member;

magnetic means coupled to said rotatable member for inducing an electrical voltage signal in said conducting means when said rotatable member is rotated and said magnetic means is operationally disposed within a first predetermined distance from said conducting means and further for producing a null signal in said conducting means when said magnetic means is operationally disposed within a second predetermined distance from said conductor, the second predetermined distance being greater than the first predetermined distance, the electrical voltage signal and the null signal each occuring at least once during a complete revolution of said rotatable member;

demodulating means coupled to said conducting means, said demodulating means including signal synthesizing means for generating, during the interval of the null signal, a synthesis signal indicative of the electrical voltage signal, wherein the frequency of the electrical voltage signal and the frequency of the synthesis signal are each indicative of the vibration of said rotatable member; and processing means coupled to said demodulating means for obtaining information indicative of vibration of the member from the electrical voltage signal and the synthesis signal.

2. Apparatus as in claim 1, wherein said signal synthesizing means includes a phase-locked loop.

3. Apparatus as in claim 1, wherein the rotatable member is surrounded by a housing having at least two segments and the conductor is disposed entirely within the radial inner boundary of one of the segments of the housing and is further coupled to, yet electrically isolated from, the one of the segments of the housing.

4. Apparatus as in claim 1, wherein the electrical voltage signal includes a predetermined portion having a greater amplitude than the remainder of the electrical voltage signal and further wherein said demodulating means includes switching means coupled to said conducting means and to said signal synthesizing means, said switching means for predeterminedly coupling the electrical voltage signal or the synthesis signal to said processing means in response to the predetermined portion of the electrical voltage signal.

5. A method for monitoring the vibration of a rotatable member, comprising:

forming an influence signal during a first portion of a complete revolution of the rotatable member, wherein the influence signal is indicative of vibration of the member;

providing a synthesis signal during a second portion of the complete revolution of the rotatable member, wherein the influence signal is not available during the second portion of the complete revolution and further wherein the synthesis signal is indicative of vibration of the member during a predetermined part of the first portion of the complete revolution; and coupling the influence signal and the synthesis signal to processor means for obtaining information indicative of vibration of the member during the complete revolution.

6. The method as in claim 5, wherein the step of forming includes partially circumferentially surrounding the rotatable member with an electrical conductor and disposing magnetic means in mechanical communication with the rotatable member, such that said magnetic means induces the influence signal in the electrical conductor during the first portion of a complete revolution of the rotatable member.

7. The method as in claim 6, wherein a predetermined portion of the influence signal has a greater amplitude than the remainder of the influence signal and further wherein the step of coupling includes predeterminedly coupling the influence signal or the synthesis signal to the processor means in response to the predetermined portion of the influence signal.

8. The method as in claim 5, wherein the step of providing further includes coupling the influence signal to a phase-locked loop, wherein the phase-locked loop generates the synthesis signal in response to the influence signal.

9. Apparatus for determining vibration of a plurality of rotatable members, each of the plurality of members fixedly disposed with respect to all other members and rotatable so as to define a circumferential path, comprising:

a plurality of conducting means for responding to electromagnetic influence, each of the plurality of conducting means disposed over a predetermined arcuate portion of the circumferential path surrounding the rotatable members and wherein said conducting means includes a pair of conductors such that each of said pair of conductors include a respective section that is disposed at 45 degrees with respect to the circumferential path of the plurality of rotatable members and each of said pair of conductors is disposed so as to be orthogonal to the other of said pair of conductors;

a plurality of electromagnetic means respectively coupled to each of said rotatable members for inducing a respective electrical voltage signal in predetermined ones of said plurality of conducting means during respective intervals of a complete revolution of said member, wherein said electrical voltage signal is indicative of vibration of the rotatable member to which electromagnetic means having induced the respective electrical voltage signal is coupled, and further wherein each of said plurality of rotatable members are further disposed such that only electromagnetic means coupled to one of said plurality of members influences one of said plurality of conducting means at a time;

switching means having a respective input coupled to each of said plurality of conducting means for receiving the respective electrical voltage signal and for directing each respective electrical signal to processing means for extracting information respectively indicative of vibration of each of said plurality of members from each respective electrical signal;

synchronizing means coupled to said plurality of rotatable members for providing an indication of the relative position between said plurality of rotatable members and said plurality of conducting means to said switching means; and, summing means having an input coupled to each of the pair of conductors for receiving the electrical voltage signal and an ouput coupled to said switching means for providing a signal indicative of the tangential component of vibration of the member in response to the sum of the electrical voltage signal available at the inputs of the summing means; and subtracting means having an input coupled to each of the pair of conductors for receiving the electrical voltage signal and an output coupled to said switching means for providing a signal indicative of the axial component of vibration of the member in response to the difference of the electrical voltage signal available at the inputs of the subtracting means.

10. The apparatus as in claim 9, wherein said subtracting means includes inverter means having an input coupled to one of the pair of conductors and an output for supplying an inverted electrical voltage signal, wherein the signal indicative of the axial component of vibration is in response to the sum of the inverted electrical voltage signal and the electrical voltage signal from the other of the pair of conductors.

* * * * *